United States Patent
Han et al.

(10) Patent No.: US 11,025,981 B2
(45) Date of Patent: Jun. 1, 2021

(54) FACILITATING PANORAMIC VIDEO STREAMING WITH BRAIN-COMPUTER INTERACTIONS

(71) Applicant: AT&T Intellectual Property I, L.P., Atlanta, GA (US)

(72) Inventors: Bo Han, Bridgewater, NJ (US); Zhengye Liu, Pleasanton, CA (US); Chenfei Gao, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 32 days.

(21) Appl. No.: 16/513,780

(22) Filed: Jul. 17, 2019

(65) Prior Publication Data
US 2021/0021888 A1    Jan. 21, 2021

(51) Int. Cl.
| H04N 21/422 | (2011.01) |
| H04N 21/81 | (2011.01) |
| H04N 21/44 | (2011.01) |
| H04N 21/458 | (2011.01) |
| H04N 21/466 | (2011.01) |

(52) U.S. Cl.
CPC . *H04N 21/42201* (2013.01); *H04N 21/44016* (2013.01); *H04N 21/458* (2013.01); *H04N 21/4667* (2013.01); *H04N 21/816* (2013.01)

(58) Field of Classification Search
CPC ....... H04N 21/42201; H04N 21/44016; H04N 21/458; H04N 21/4667; H04N 21/816
See application file for complete search history.

(56) References Cited

U.S. PATENT DOCUMENTS

| 10,623,791 B2 | 4/2020 | Han et al. |
| 2010/0157064 A1* | 6/2010 | Cheng .................... H04N 5/247 348/169 |

(Continued)

FOREIGN PATENT DOCUMENTS

| WO | WO-2018200734 A1 * | 11/2018 | ............. G06F 3/015 |

OTHER PUBLICATIONS

Friedman, Doron et al., Navigating Virtual Reality by Thought: What Is It Like? Presence, vol. 16, No. 1, pp. 100-110, 2007.

(Continued)

*Primary Examiner* — Sumaiya A Chowdhury
(74) *Attorney, Agent, or Firm* — Guntin & Gust, PLC; Atanu Das

(57) ABSTRACT

Aspects of the subject disclosure may include, for example, obtaining one or more signals, the one or more signals being based upon brain activity of a viewer while the viewer is viewing media content; predicting, based upon the one or more signals, a first predicted desired viewport of the viewer; obtaining head movement data associated with the media content; predicting, based upon the head movement data, a second predicted desired viewport of the viewer; comparing the first predicted desired viewport to the second predicted desired viewport, resulting in a comparison; and determining, based upon the comparison, to use the first predicted desired viewport to facilitate obtaining a first subsequent portion of the media content or to use the second predicted desired viewport to facilitate obtaining a second subsequent portion of the media content. Other embodiments are disclosed.

20 Claims, 16 Drawing Sheets

(56) References Cited

U.S. PATENT DOCUMENTS

| | | | |
|---|---|---|---|
| 2018/0189958 A1* | 7/2018 | Budagavi | G06T 7/20 |
| 2018/0302601 A1* | 10/2018 | Chen | H04N 13/366 |
| 2019/0102944 A1 | 4/2019 | Han et al. | |
| 2019/0104324 A1 | 4/2019 | Han et al. | |
| 2019/0310472 A1* | 10/2019 | Schilt | H04N 21/2662 |
| 2019/0373298 A1 | 12/2019 | Han et al. | |
| 2020/0050884 A1 | 2/2020 | Han et al. | |

OTHER PUBLICATIONS

LéCuyer, Anatole et al., Brain-Computer Interfaces, Virtual Reality, and Videogames. Computer, vol. 41, No. 10, pp. 66-72, 2008.
Pfurtscheller, Gert et al., Motor Imagery and Direct Brain-Computer Communication. Proceedings of IEEE 82(7), Proceedings of the IEEE, vol. 89, No. 7, July 2001, pp. 1123-1134.

* cited by examiner

4002 — Receiving from a device a request for a portion of media content, the request indicating a desired viewport, the request having been made by the device in accordance with a determination by the device to use as the desired viewport one of a first predicted desired viewport or a second predicted desired viewport, the determination having been based upon a comparison between the first predicted desired viewport and the second predicted desired viewport, the first predicted desired viewport having been predicted by the device based upon brain activity of a viewer engaged in watching an earlier portion of the media content, and the second predicted desired viewport having been predicted by the device based upon head movement data associated with the earlier portion of the media content

4004 — Sending, to the device, the portion of media content that had been requested

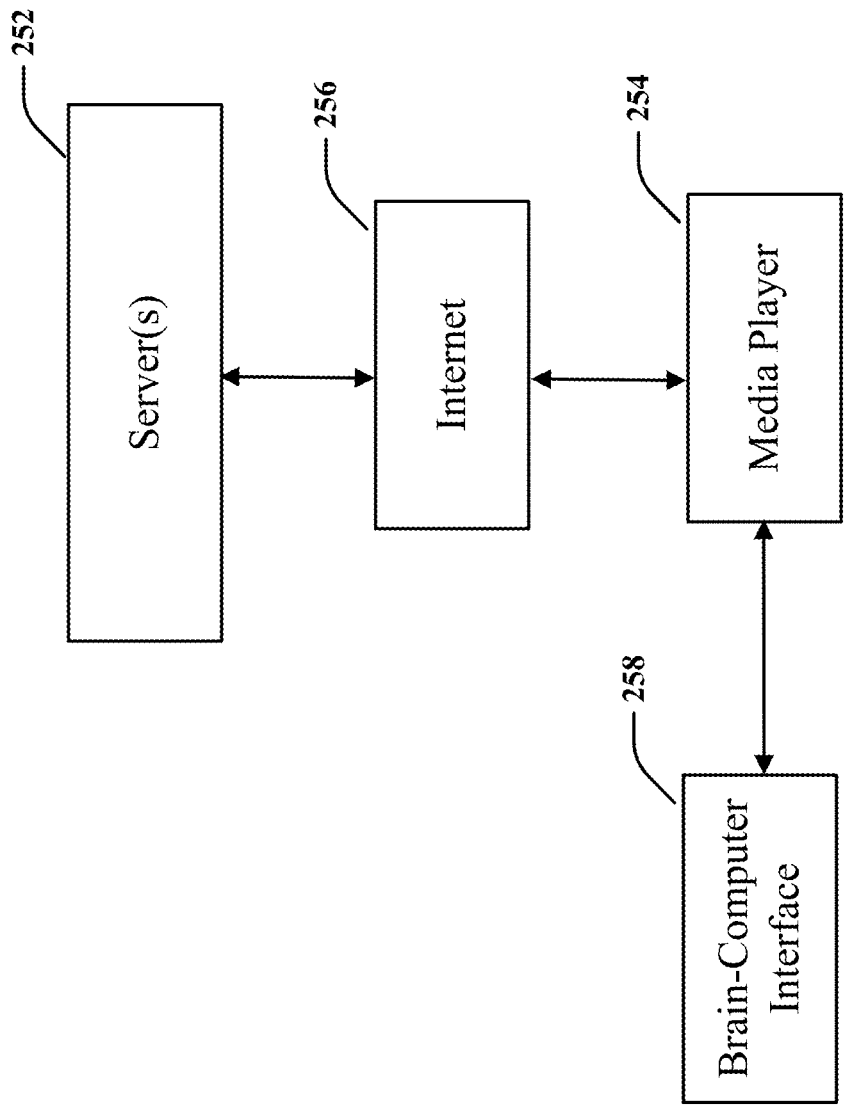

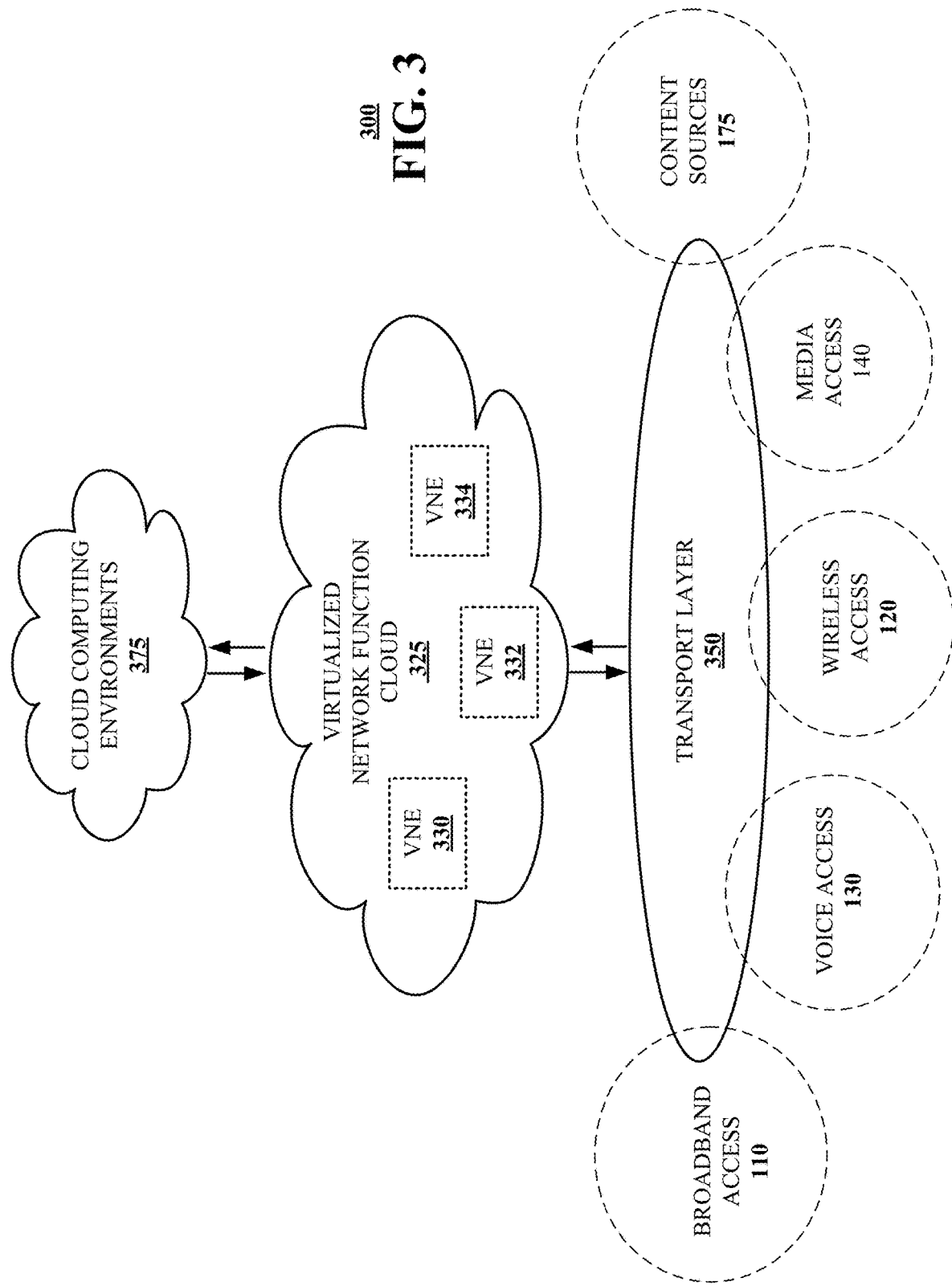

FACILITATING PANORAMIC VIDEO STREAMING WITH BRAIN-COMPUTER INTERACTIONS

FIELD OF THE DISCLOSURE

The subject disclosure relates to facilitating panoramic video streaming with brain-computer interactions.

BACKGROUND

Panoramic or immersive video (each of which can include, for example, 360-degree video), is a critical component in the Virtual Reality ("VR") ecosystem. Such 360-degree video (sometimes referred to herein as 360° video) is becoming increasingly popular on commercial video content platforms. In a typical 360-degree video system, a user wearing a VR headset can freely change his or her viewing direction. Technically, the user is situated in the center of a virtual sphere, and the panoramic content downloaded from video server(s) is projected onto the sphere (e.g., using equirectangular projection). The user's viewport (visible area) is typically determined by his or her viewing direction (in latitude/longitude) and the Field of View ("FoV") of the VR headset in real-time. The FoV defines the extent of the observable area, which is usually a fixed parameter of a VR headset. As shown in FIG. 2A, a user wearing a VR headset 201 can adjust his or her orientation by changing the pitch, yaw, and roll, which correspond to rotating along the X, Y, and Z axes, respectively (see, also, in this FIG. example viewport 203).

Maintaining good Quality of Experience ("QoE") for 360° videos over bandwidth-limited links on commodity mobile devices remains challenging. First, 360° videos are large: under the same perceived quality, 360° videos have around 5× larger sizes than conventional videos. Second, 360° videos are complex: sophisticated projection and content representation schemes may incur high overhead. Third, 360° videos are still under-explored: there is a lack of real-world experimental studies of key aspects such as rate adaptation, QoE metrics, and cross-layer interactions (e.g., with TCP and web protocols such as HTTP/2).

Certain existing work on 360° video streaming can be divided into two categories: monolithic streaming and tile-based streaming. A simply monolithic streaming delivers uniformly encoded panoramic views and is widely used by most commercial 360° video content providers. The drawback is that, at any given time, typically only 15-20% of the content that is being downloaded is actually in the FoV of the end user, which is a waste of bandwidth resources. For more advanced schemes that perform viewport adaptation, a 360° video has multiple versions each having a different scene region, sometimes called a Quality Emphasized Region ("QER"), with a high encoding rate. A video player picks the correct version based on the viewer's head orientation. This scheme is sometimes referred to as versioning-based 360° video streaming. One practical issue of this versioning-based 360° video streaming scheme is that it incurs significant overhead at the server side (e.g., the FACEBOOK OCULUS 360 mechanism is believed to require servers to maintain up to 88 versions of the same video).

For the tiling scheme, a 360° video is spatially segmented into tiles. Delivered are mainly tiles overlapping with predicted FoVs for viewport-adaptive video streaming. To increase the robustness, a video player can also fetch the remaining tiles at lower qualities. Each 360° video chunk is pre-segmented into multiple smaller chunks, which are called tiles. The easiest way to generate the tiles is to evenly divide a chunk containing projected raw frames into m×n rectangles each corresponding to a tile. Suppose, for example, that the projected visible area is $\ominus$. In this example, the client (e.g., video player) only sends requests for the tiles that overlap with $\ominus$.

Referring now to FIG. 2B, an example is shown where m=6 and n=4, and $\ominus$ is the shaded oval region 210. An original video chunk is segmented into tiles. A tile (see, e.g., the tile in the upper right-hand corner) has the same duration and number of frames as the chunk it belongs to, but occupies only a small spatial portion. Each tile can be independently downloaded and decoded. A tile can also refer to a small spatial portion only in a frame. In that sense, a tile-based video chunk can be independently fetched and decoded. In this example, the client will only request the six tiles overlapping with $\ominus$ (that is, where $1 \leq x \leq 3$, $1 \leq y \leq 2$). Note that due to projection, despite the viewer's FoV being fixed, the size of $\ominus$ and thus the number of requested tiles may vary. Compared to FoV-agnostic approaches, tiling offers significant bandwidth savings. Also note that the tiling scheme can be applied to not only videos using Equirectangular projection, but also those with Cube Map projection.

Certain proposals have previously been made to improve the accuracy of viewport prediction by leveraging data fusion of multiple sources, such as head movement, video content analysis and user profile. Popular 360° videos from commercial content providers and video-sharing websites attract a large number of viewers (e.g., more than 4 million views of the video represented by FIG. 2B). Also, it is known that users' viewing behaviors are often affected by the video content. It is believed that this is also true for 360° videos: at certain scenes, viewers are more likely to look at certain spots or directions, and thus the FoV can be predicted based on the video content. Consider an example of a mountain climbing video. When viewers are "climbing" towards the peak, they may look upward most of the time to figure out how long it will take to reach the peak.

Based on the above observation, there have been proposals to use crowdsourced viewing statistics by instrumenting the 360° video players to record the frequency of a given FoV, which can be easily be collected by video servers. With the crowdsources data, a heat map can be generated showing the most frequently viewed content in a 360° video. In the literature, viewing statistics have been leveraged to estimate the video abandonment rate and to automatically rate video contents. In the context of 360° videos, for each chunk, the server can also record download frequencies of its tiles, and provide client video players with such statistics as a heat map of content access pattern through metadata exchange. A tile's download frequency is defined in this context as the number of video sessions that fetch this tile divided by the total number of sessions accessing this video.

Besides the heat map based approach, certain proposals have previously been made to employ object-feature detection for certain types of videos. For example, for soccer and tennis videos, these objects could be the soccer and tennis balls, key soccer players and referee. When watching these sport videos, most likely the viewers will follow the movement of the soccer and tennis balls. Even without using the heat map, it can be predicted that the tiles containing the ball will very likely overlap with the FoV and these tiles can be identified via object-feature detection of video frames.

Moreover, certain existing work has demonstrated that it is possible to model the video viewing behavior of users by leveraging stochastic models such as a Markovian model.

The model can be constructed using actions from a user when viewing a 360° video, including pause, stop, jump, forward and rewind. This type of user profile complements the head movement based FoV prediction. Even if a user does not change the view direction, the FoV may change dramatically if a forward/rewind action is issued by the viewer. The stochastic models of video viewing behavior can help improve the accuracy of FoV prediction. The future FoV prediction can also leverage the personal interest of a user. For example, if it is known from a profile that a user does not like thrilling scenes, very likely he/she will skip this type of content when watching a 360° video. Thus, the probability of predicting a FoV from these scenes will be low.

Reference will now be made to certain aspects of conventional Brain-Computer Interfaces for VR. According to Wikipedia: A brain-computer interface (BCI), sometimes called a neural-control interface (NCI), mind-machine interface (MMI), direct neural interface (DNI), or brain-machine interface (BMI), is a direct communication pathway between an enhanced or wired brain and an external device. Certain existing BCI mechanisms can be divided into three categories: invasive BCIs that are directly implanted into the grey matter of the brain; partially invasive BCI devices which are implanted inside the skull with the rest outside the brain and thus the grey matter; and non-invasive BCIs. The most widely used non-invasive BCIs leverage electroencephalography ("EEG"), mainly due to its portability, ease of use, fine temporal resolution and low set-up cost. However, it is somewhat susceptible to noise. Other technologies that have been used successfully for non-invasive BCIs include magnetoencephalography ("MEG") and functional Magnetic Resonance Imaging ("fMRI").

A number of prototypes have been proposed to enable users to navigate in virtual environments [see, e.g., Doron Friedman, Robert Leeb, Christoph Guger, Anthony Steed, Gert Pfurtscheller and Mel Slater. Navigating Virtual Reality by Thought: What Is It Like? *Presence*, Vol. 16, No. 1, pages 100-110, 2007] and manipulate virtual objects [see, e.g., Anatole Lécuyer, Fabien Lotte, Richard B. Reilly, Robert Leeb, Michitaka Hirose and Mel Slater. Brain-Computer Interfaces, Virtual Reality, and Videogames. *Computer*, Vol. 41, No. 10, pages 66-72, 2008] solely by BCIs, for example, by analyzing cerebral activity which is recorded on the scalp via EEG electrodes. In terms of conventional use in facilitating panoramic video viewing experiences, BCIs can be decomposed into several elementary tasks, such as moving left/right and up/down, in order to change the viewport when viewing 360° videos. It has actually been shown by Pfurtscheller and Neuper [see, e.g., Gert Pfurtscheller and Christa Neuper. Motor Imagery and Direct Brain-Computer Communication. Proceedings of IEEE 82(7), pages 1123-1134] that one can identify from EEG signals several mental processes, for example, the imagination of various pre-defined movements. One can then transform such thought-related EEG signals into a control signal, which can in turn be associated with a few simple computer commands, such as cursor movement.

Referring now to FIG. 2C, a diagram is depicted that shows how certain conventional BCIs can facilitate various VR applications (including navigation in the context of panoramic 360° video streaming). Essentially, there is a closed loop with four steps. First, the EEG device 222 collects the "thoughts" from a viewer through the BCI device 224 attached on the head of the viewer. Second, the EEG analyzer 226 processes the signals and transforms them into navigation commands, such as (for example) moving toward left. Third, the EEG analyzer 226 sends the instructions to the VR display device 228 (which could be, for example, combined with the BCI device 224 into a single unit). Finally, the VR device 228 changes the viewport based on the instruction from the EEG analyzer 226.

BRIEF DESCRIPTION OF THE DRAWINGS

Reference will now be made to the accompanying drawings, which are not necessarily drawn to scale, and wherein:

FIG. 2J depicts an illustrative embodiment of a method in accordance with various aspects described herein.

FIG. 2K is a block diagram illustrating an example, non-limiting embodiment of a system in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for facilitating panoramic video streaming with brain-computer interactions. Other embodiments are described in the subject disclosure.

Various embodiments facilitate and optimize the delivery of 360° videos by leveraging brain-computer interactions (e.g., to improve the accuracy of head movement based viewport prediction). As described herein, certain conventional viewport prediction techniques have enabled viewport adaptive streaming of 360° videos (which delivers only predicted viewport of a frame at high quality and the remainder of the frame with a low quality). Such certain conventional work mainly utilizes viewport movement traces (e.g., by collecting the head movement traces when viewing 360° videos with a head-mounted display) for the prediction. Although this approach is lightweight and can achieve a reasonable accuracy in general, it is typically limited by the inherent "randomness" of the movement trajectory. Further, viewport changes are naturally controlled by the brain of the viewer and certain conventional Brain-Computer Interfaces ("BCIs") have been extensively investigated to facilitate various aspects of human-computer interactions. On one hand, it has been demonstrated that BCI could potentially provide more intuitive and suitable interactions for VR applications. On the other hand, the research community widely accepts that VR could be a promising medium for efficiently improving BCI systems. Various embodiments described herein combine the predictions of future viewport from head movement traces and viewport moving direction derived from the analysis of brain signals. If the two predictions are consistent, then (in one embodiment) the fine-granularity prediction from head movement traces will be used to actively and adaptively prefetch video content in the predicted viewport in advance. Otherwise (that is, if the two predictions are not consistent), the viewport video prefetching will (in one embodiment) be guided (e.g., largely guided) by the prediction of viewport moving direction from brain signals (which, it is believed, should be more accurate than the head movement based viewport prediction).

Figure 1:
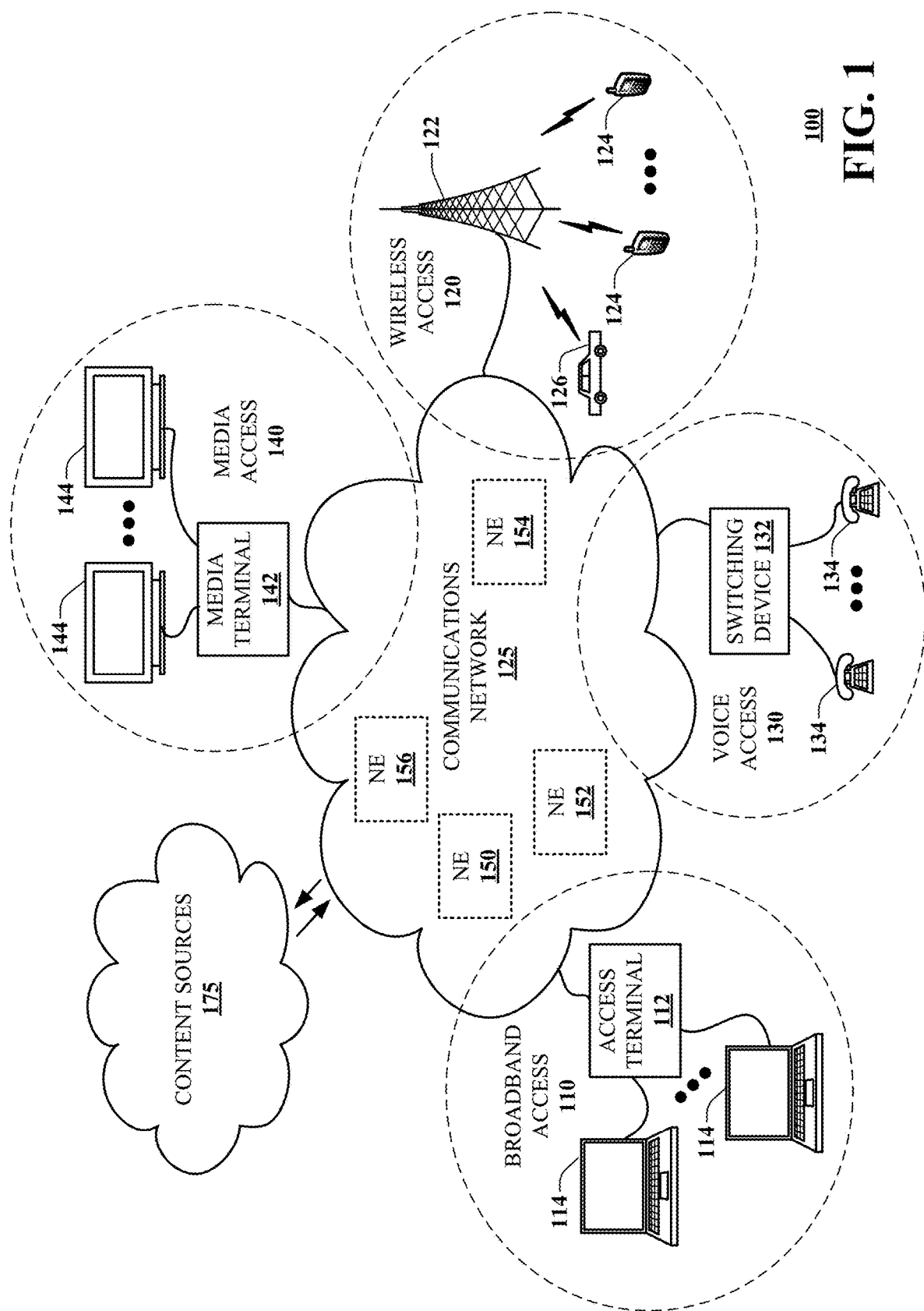
FIG. 1 is a block diagram illustrating an example, non-limiting embodiment of a communication network in accordance with various aspects described herein.

Referring now to FIG. 1, a block diagram is shown illustrating an example, non-limiting embodiment of a communication network 100 in accordance with various aspects described herein. For example, communication network 100 can facilitate in whole or in part panoramic video streaming (such as in the context of viewport prediction/selection as described herein). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

As described herein, an essential component in certain viewport-adaptive 360° video players is to predict users' future viewports (e.g., via head movement prediction), which is important for both tiling-based and versioning-based viewport-adaptive 360° video streaming. Provided herein is a discussion directed to a systematic investigation that was made of real users' head movements, as well as how to efficiently perform viewport prediction on mobile devices. Using a dataset consisting of 4420-minute 360° video playback time, studied were a wide spectrum of machine learning ("ML") algorithms for viewport prediction. Also, designed were lightweight but robust viewport prediction methods by strategically leveraging off-the-shelf ML algorithms.

With reference now to viewport prediction accuracy, it is noted that ideally, if a viewer's future FoV during a 360° video session is known beforehand, the optimal sequence of tiles that minimizes the bandwidth consumption can be generated. By leveraging head movement traces, for example, a sliding window of 1 second from T−1 to T can be used to predict future head position (and thus the FoV) at T+δ for each dimension of yaw, pitch, and roll. Evaluated were the prediction accuracy of various Machine Learning algorithms for three prediction windows, 0.2, 0.5 and 1 s (see FIGS. 2D, 2E, 2F).

Figure 2A:
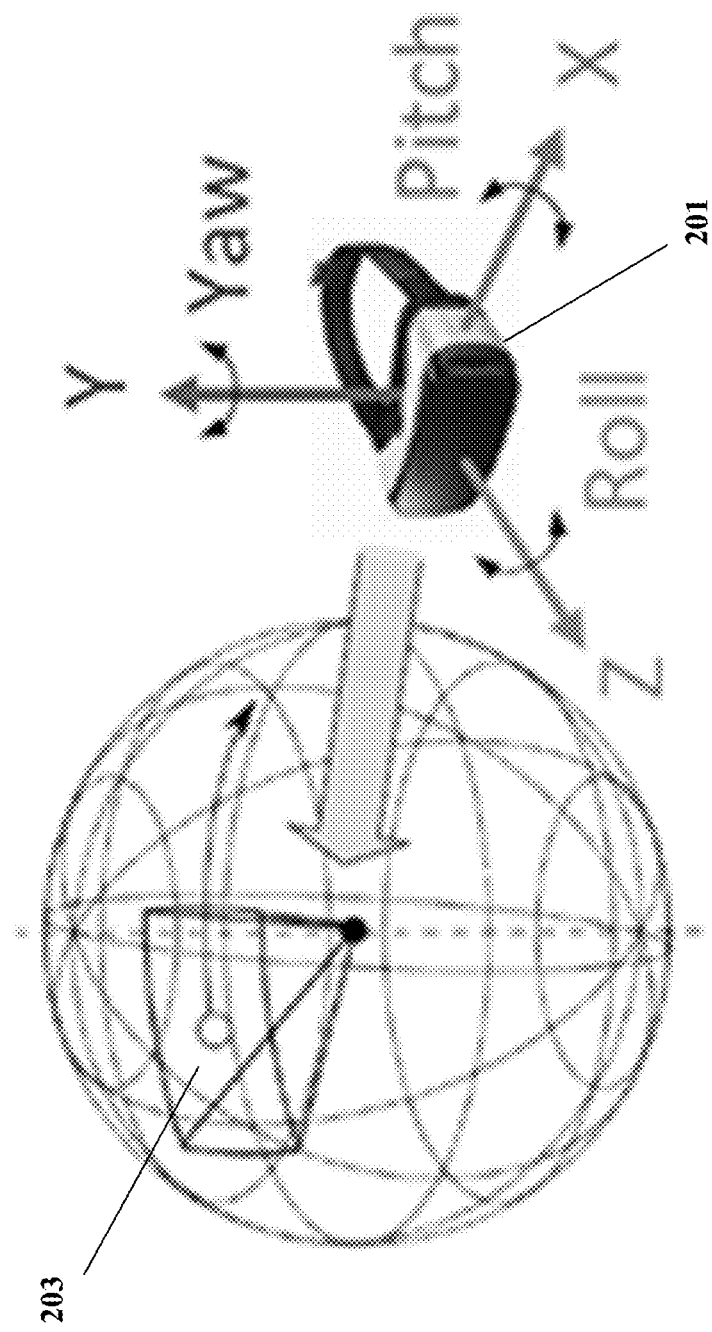
FIG. 2A is a diagram illustrating various conventional coordinate systems and an FoV example associated with adjusting of 360° video viewing directions.
Figure 2B:
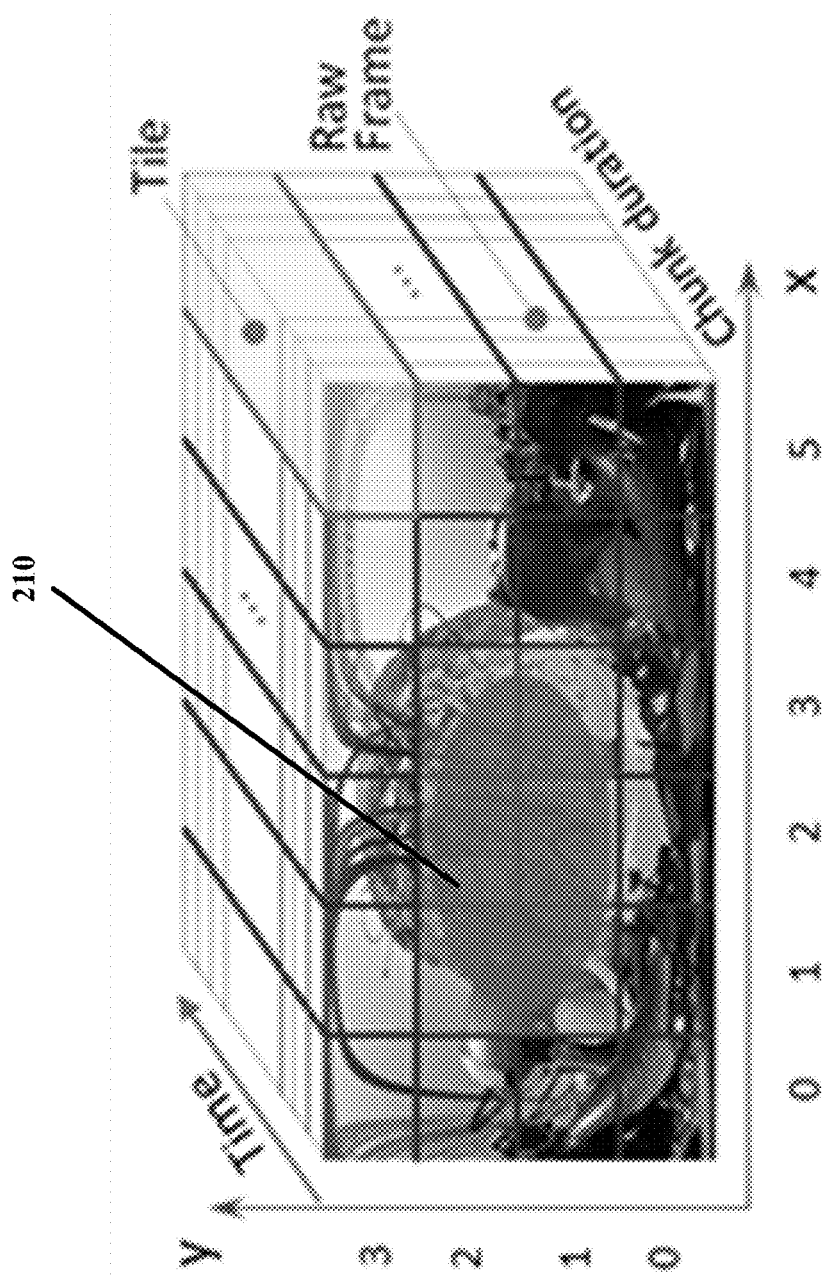
FIG. 2B is a diagram illustrating certain conventional example chunk, tile, frame, and tile segmentation (4×6 tiles).
Figure 2C:
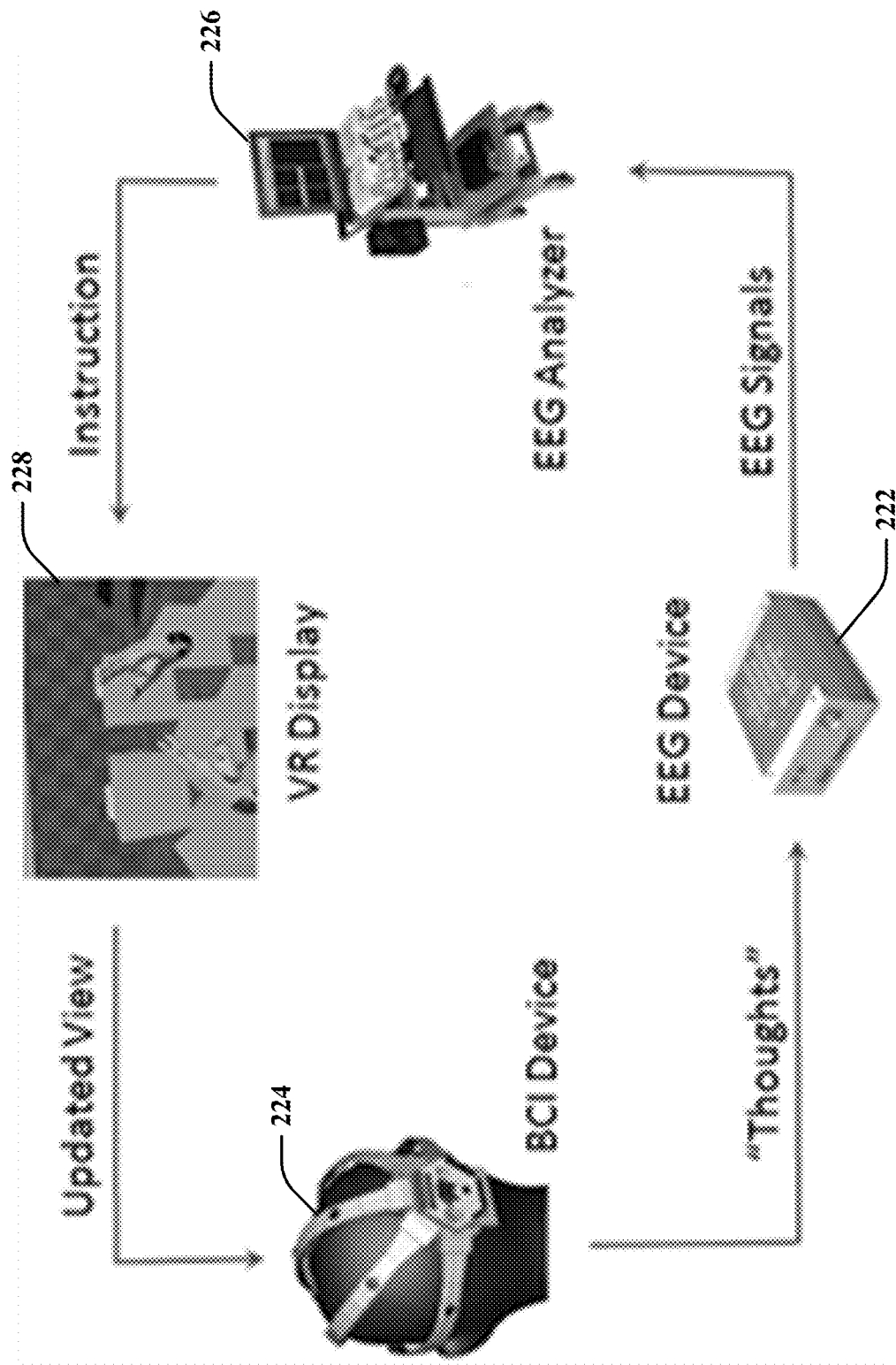
FIG. 2C is a diagram that shows how certain conventional BCIs can facilitate various VR applications.
Figure 2D:
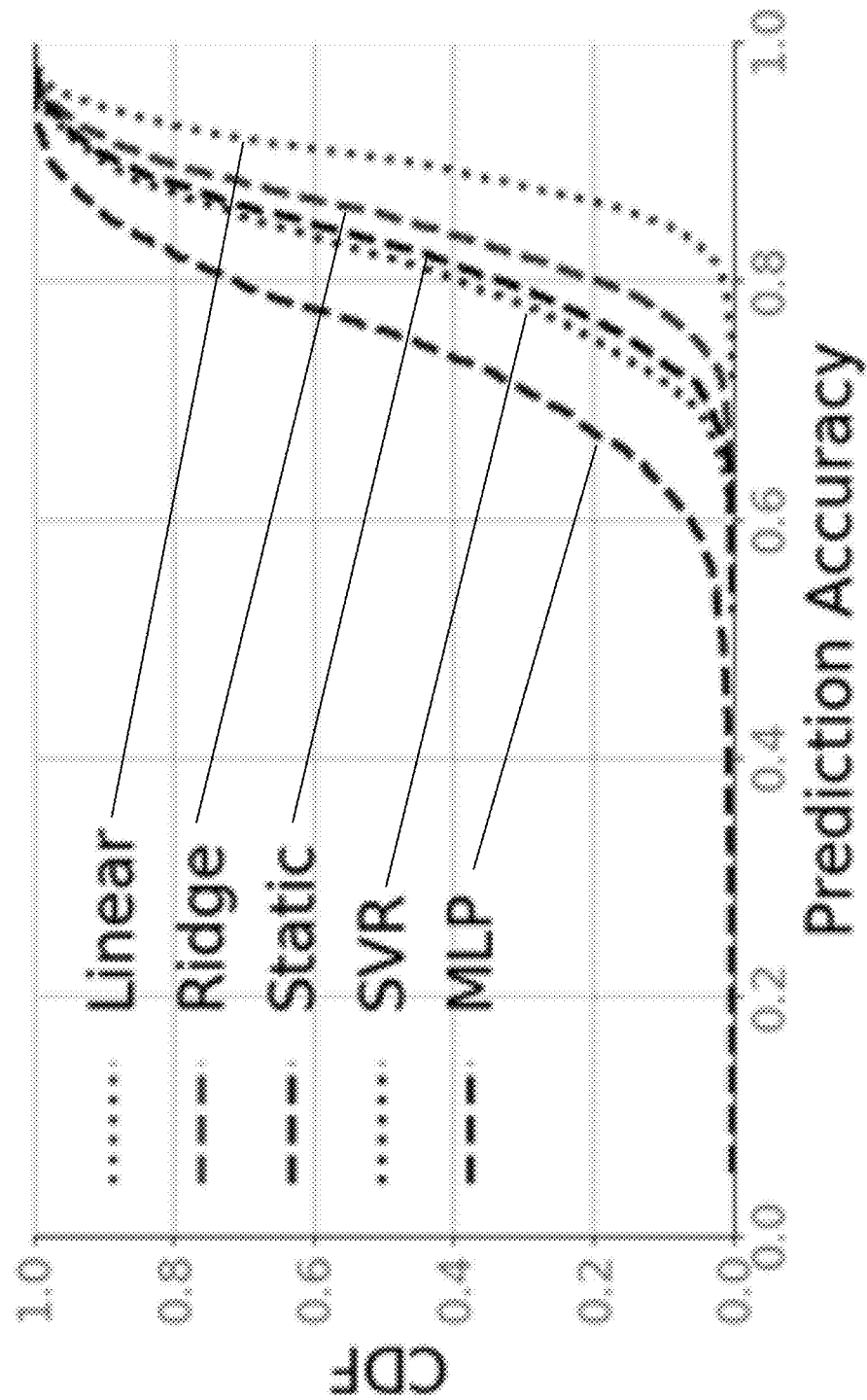
FIGS. 2D, 2E, 2F show, respectively, graphs of data (which can be applicable to various embodiments) related to prediction accuracy of different Machine Learning algorithms for three prediction windows: 0.2 s, 0.5 s and 1 s (each for 4×6 segmentation of tile-based streaming).
Figure 2E:
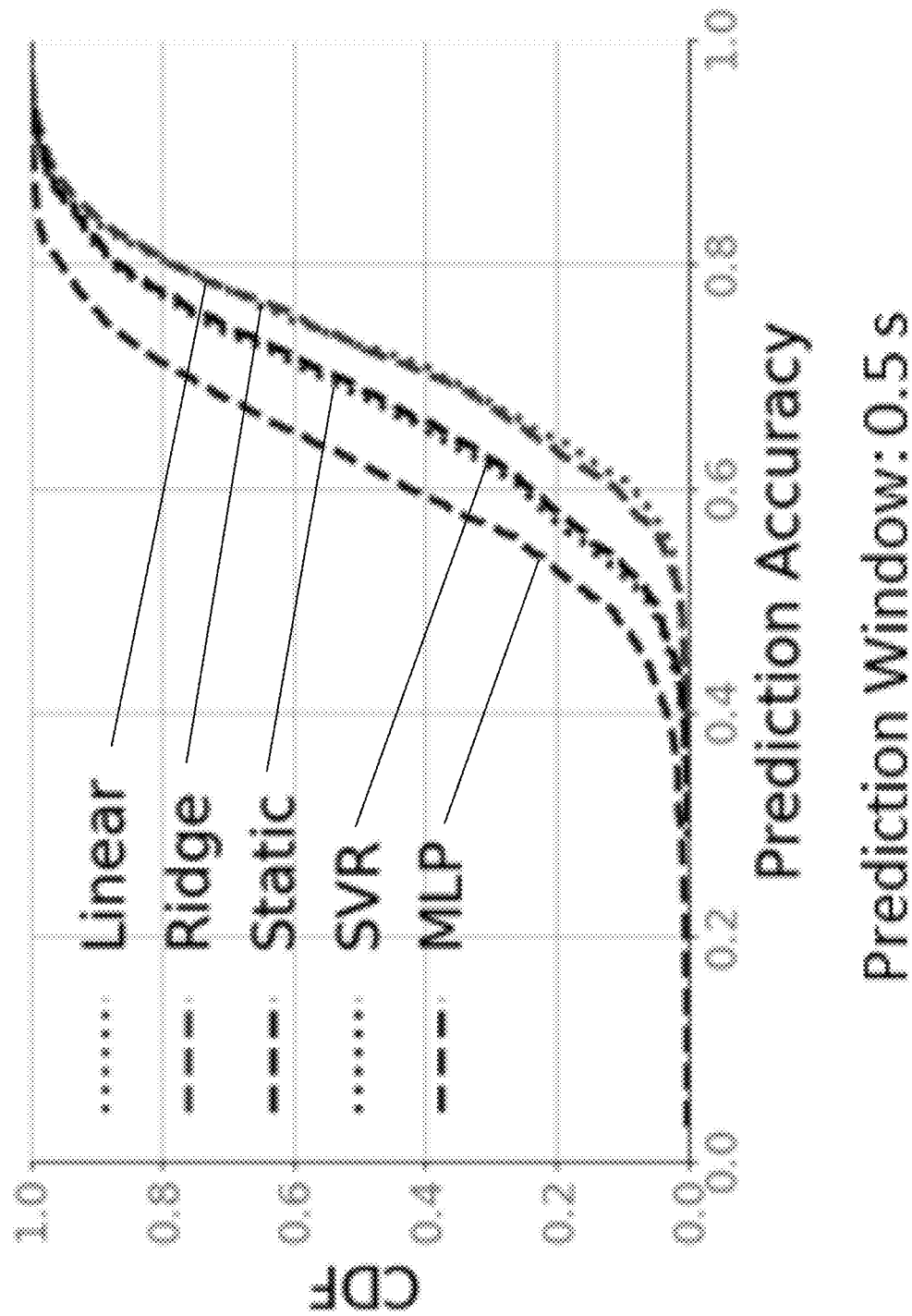
Figure 2F:
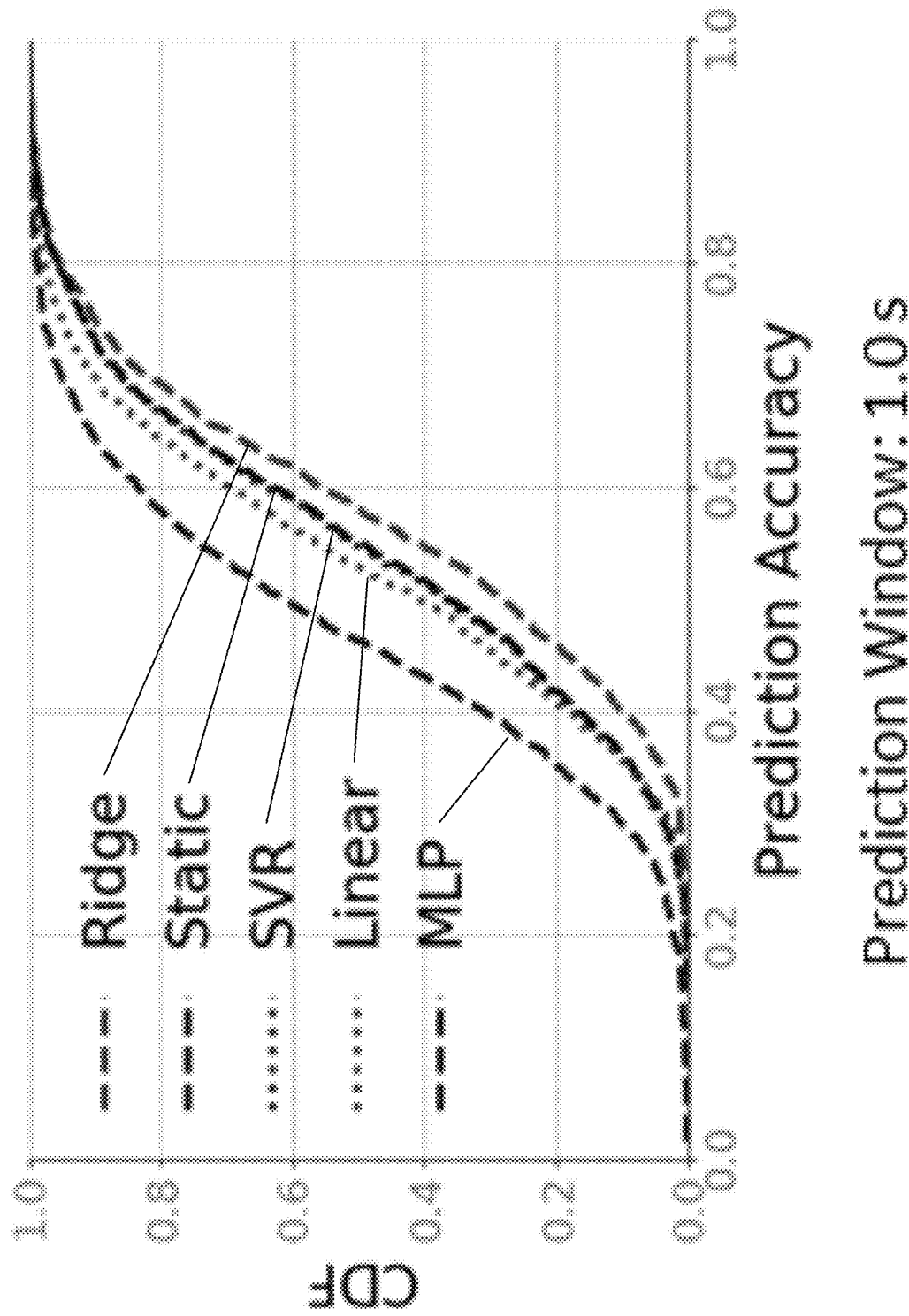

Still referring to FIGS. 2D, 2E, 2F, the training data is historical head movement traces collected during the user study mentioned above with more than 130 participants. Used were four Machine Learning algorithms—3 classical models and 1 neural network model. The classical models are Linear Regression, Ridge Regression and Support Vector Regression (with rbf kernel). The neural network model is Multi-Layer Perceptron. Also used was a simple heuristic, called Static, which assumes that the viewport does not change from T to T+δ. For the 4×6 segmentation scheme, the viewport prediction is accurate if the tile set determined by the predicted viewport is exactly the same as the ground truth. The key take-away from FIGS. 2D, 2E, 2F is that the viewport prediction accuracy depends heavily on the prediction window. The longer this window is, the lower the prediction accuracy. However, smaller prediction windows lead to a strict requirement on the end-to-end latency.

As described herein in connection with various embodiments, if it can be determined in advance how a viewer is going to change the viewport (for example, how the viewer is going to move his or her head) when watching a 360° video then this information can be utilized to improve the accuracy of viewport prediction. In one example, the future head movement can be predicted by analyzing brain signals/waves of the viewer.

Figure 2G:
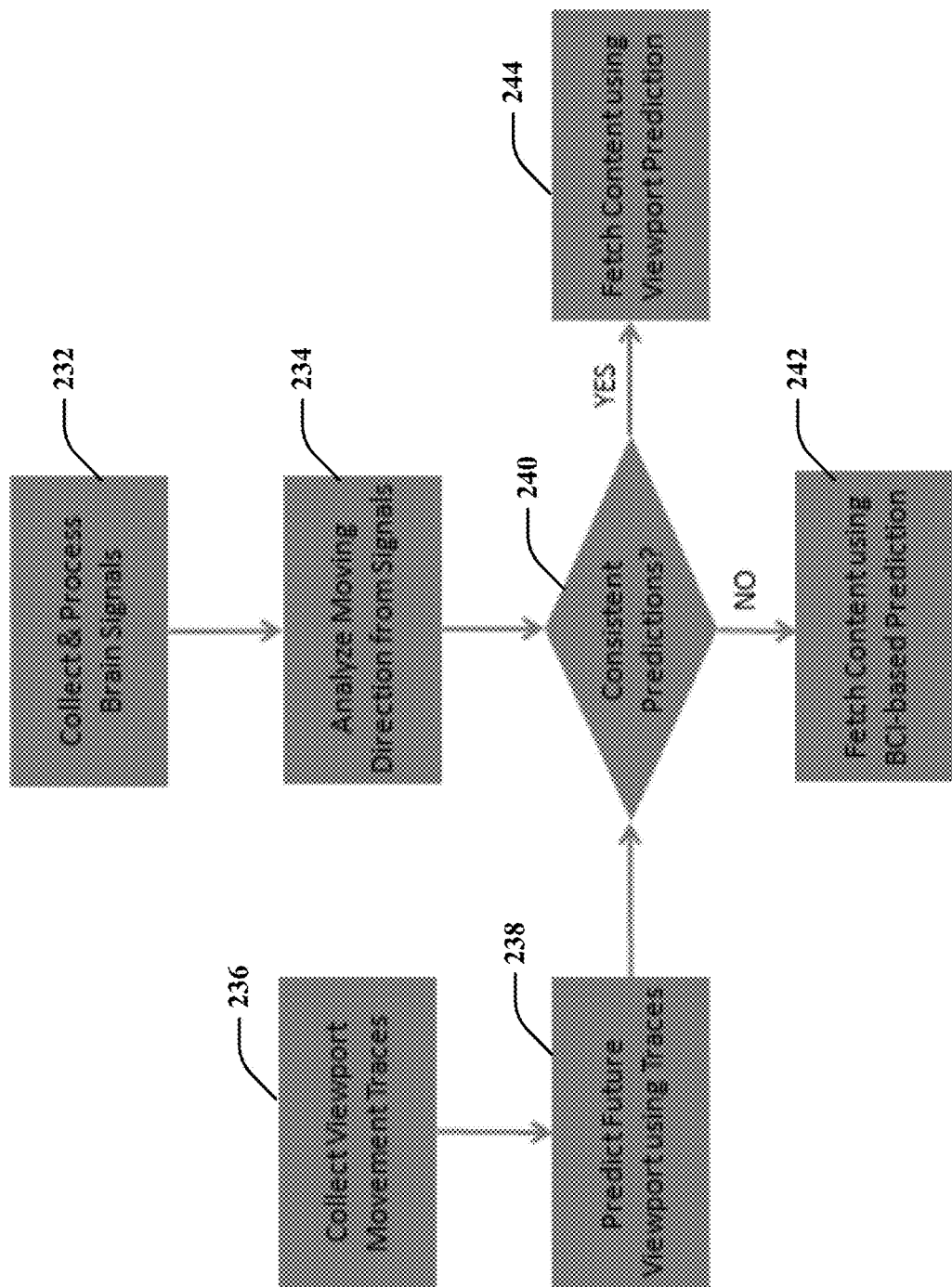
FIG. 2G is a block diagram illustrating an example, non-limiting embodiment of a workflow functioning within the communication network of FIG. 1 in accordance with various aspects described herein (the workflow of this FIG. utilizes BCIs for viewport prediction).

Referring now to FIG. 2G, a diagram (according to an embodiment) of workflow that leverages BCIs for improving the accuracy of viewport prediction for 360° video streaming is shown. In this FIG. the workflow includes step 232, which is collecting and processing the brain signals of a viewer when he or she watches a 360° video. By analyzing these signals (see step 234), it can be determined roughly to which direction the viewer wants to change his or her viewport. The workflow also includes step 236, which is collecting viewport movement trajectory, for example, from head movement traces collected by motion sensors. At step 238 one or more machine learning technologies are applied to predict one or more future viewports based on the collected movement traces. At this point, there are now two sources of prediction for future viewports (one source based on BCI and another source based on head movement data). At step 240 the two viewport predictions from the two sources are compared (and it is determined whether the two viewport predictions are consistent with each other).

Still referring to FIG. 2G, if the moving direction analyzed from the BCI signals aligns with the future viewport predicted using machine learning algorithms (e.g., linear regression), then the workflow prefetches video content in the machine learning predicted (consistent) viewport which usually can provide fine-granularity information (see step 244 as a result of "YES" from step 240). Otherwise (see step 242 as a result of "NO" from step 240), BCI-based prediction will be used to guide the content prefetch (which, in theory, should be more accurate than machine learning based prediction). During the user study described herein, it was found that some viewers will suddenly and dramatically change the viewing direction, for example, when attracted by a loud sound from the left while moving their heads toward the right. In this case, viewport prediction by applying machine learning algorithms on head movement traces will become inaccurate, because the predicted trend is no longer valid any more. On the other hand, the BCI-based solution of various embodiments described herein can offer more accurate prediction by analyzing what the viewer's "thoughts" are. Of note, various embodiments described herein can be agnostic to the underlying technology to support BCIs (which can be, for example, EEG, MEG, and/or fMRI). In another example, an underlying technology to support BCIs can be any technology that enables the understanding of the mapping between brain signals and the predefined navigation commands.

While for purposes of simplicity of explanation, the respective processes are shown and described as a number of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2H:
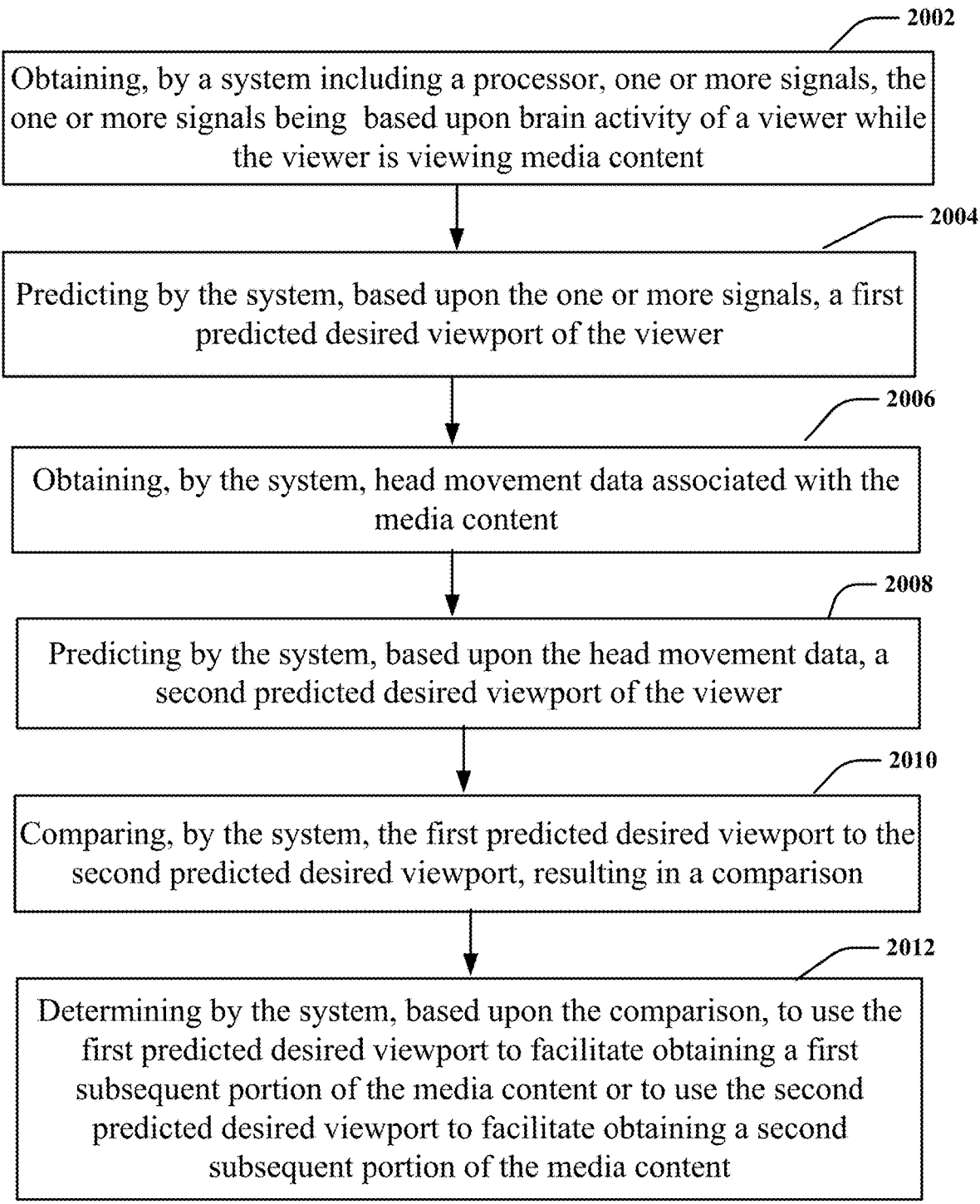
FIG. 2H depicts an illustrative embodiment of a method in accordance with various aspects described herein.

Referring now to FIG. 2H, various steps of a method 2000 according to an embodiment are shown. As seen in this FIG. 2H, step 2002 comprises obtaining, by a system including a processor, one or more signals, the one or more signals being based upon brain activity of a viewer while the viewer is viewing media content. Next, step 2004 comprises predicting by the system, based upon the one or more signals, a first predicted desired viewport of the viewer. Next, step 2006 comprises obtaining, by the system, head movement data associated with the media content. Next, step 2008 comprises predicting by the system, based upon the head movement data, a second predicted desired viewport of the viewer. Next, step 2010 comprises comparing, by the system, the first predicted desired viewport to the second predicted desired viewport, resulting in a comparison. Next, step 2012 comprises determining by the system, based upon the comparison, to use the first predicted desired viewport to facilitate obtaining a first subsequent portion of the media content or to use the second predicted desired viewport to facilitate obtaining a second subsequent portion of the media content.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2I:
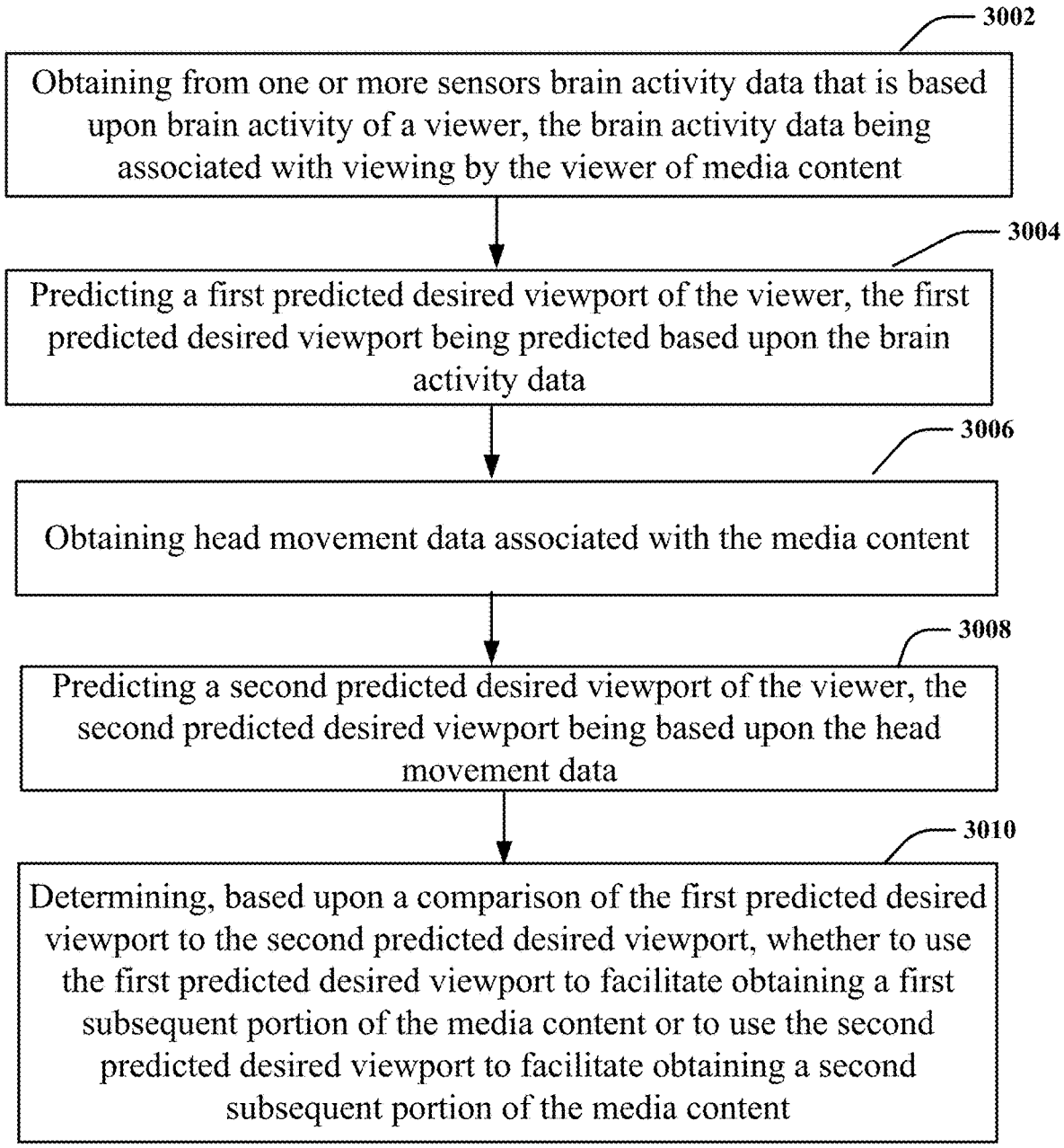
FIG. 2I depicts an illustrative embodiment of a method in accordance with various aspects described herein.

Referring now to FIG. 2I, various steps of a method 3000 according to an embodiment are shown. As seen in this FIG. 2I, step 3002 comprises obtaining from one or more sensors brain activity data that is based upon brain activity of a viewer, the brain activity data being associated with viewing by the viewer of media content. Next, step 3004 comprises predicting a first predicted desired viewport of the viewer, the first predicted desired viewport being predicted based upon the brain activity data. Next, step 3006 comprises obtaining head movement data associated with the media content. Next, step 3008 comprises predicting a second predicted desired viewport of the viewer, the second predicted desired viewport being based upon the head movement data. Next, step 3010 comprises determining, based upon a comparison of the first predicted desired viewport to the second predicted desired viewport, whether to use the first predicted desired viewport to facilitate obtaining a first subsequent portion of the media content or to use the second predicted desired viewport to facilitate obtaining a second subsequent portion of the media content.

While for purposes of simplicity of explanation, the respective processes are shown and described as a series of blocks in FIG. 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2J, various steps of a method 4000 according to an embodiment are shown. As seen in this FIG. 2J, step 4002 comprises receiving from a device a request for a portion of media content, the request indicating a desired viewport, the request having been made by the device in accordance with a determination by the device to use as the desired viewport one of a first predicted desired viewport or a second predicted desired viewport, the determination having been based upon a comparison between the first predicted desired viewport and the second predicted desired viewport, the first predicted desired viewport having been predicted by the device based upon brain activity of a viewer engaged in watching an earlier portion of the media content, and the second predicted desired viewport having been predicted by the device based upon head movement data associated with the earlier portion of the media content. Next, step 4004 comprises sending, to the device, the portion of media content that had been requested.

While for purposes of simplicity of explanation, the respective processes are shown and described as a series of blocks in FIG. 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2K, depicted is a block diagram illustrating an example, non-limiting embodiment of a system 250 in accordance with various aspects described herein. As seen in this FIG. server(s) 252 are in bi-directional communication with media player 254 via the Internet 256. The server(s) 252 store content (e.g., 360° video content) that is streamed to the media player. The server(s) 252 also store a database of historic head movement data associated with the stored video content. The media player 254 obtains (from BCI 258) BCI data (e.g., real-time BCI data) associated with a viewer who is using the media player 254 to view a video (the BCI 258 can be separate from the media player 254 or integrated with/into the media player 254). The media player 254 requests from the server(s) 252 appropriate portions of the video (e.g., appropriate tiles). The appropriate portions can be determined by the media player 254 using determination techniques as described herein.

In another example, the media player 254 sends to the server(s) 252 the BCI data, the server(s) 252 determine (based upon the BCI data and/or the historic head movement data) the appropriate portions of the video (e.g., appropriate tiles) to send back to the media player 254, and the server(s) 252 send back to the media player 254 the determined appropriate portions of the video (e.g., appropriate tiles). The appropriate portions can be determined by the servers(s) 252 using determination techniques as described herein.

As described herein, a key basis of certain previous proposals related to viewport prediction of 360° videos is the historical head movement trajectory and the consideration of other factors that may indirectly affect the head movement, for example, video content and user profile. However, some of these schemes are typically not very accurate, especially for large prediction windows, due to the inherent randomness of human head movement when watching 360° videos. Further, how the viewport changes can actually be considered as directly determined by what content the viewer wants to consume and thus is controlled by the viewer's brain. Therefore, various embodiments described herein target an improvement of the viewport prediction accuracy (for example, in the context of panoramic video streaming) by leveraging brain-computer interactions. In one specific example, viewport prediction accuracy is improved for large prediction windows.

As described herein, in a manner differently from certain existing head-mounted displays that control the viewport mainly based on motion data from sensors, when using a BCI according to an embodiment a viewer does not need to move his or her head in order to change the content they are seeing for 360° video streaming. The viewer can navigate via his or her "thoughts".

As described herein, a BCI can be used to navigate the viewing. In an embodiment, even if a BCI is not used to actually control the navigation, a BCI can be used to leverage the BCI signals to facilitate the viewport prediction.

As described herein, a comparison can be made between a BCI-based prediction (based on brain activity) and a traditional viewport prediction (based on head movement trajectory). If they are consistent, the fine-granularity prediction from head movement traces can be used to actively and adaptively prefetch video content in the predicted viewport in advance. Otherwise, the viewport video prefetching can be largely guided by the prediction of viewport moving direction from brain signals (which should be more accurate than the head movement based viewport prediction).

In one example, the determination that the viewport predicted by the head movement data should be used can be made based upon the viewport predicted by the head movement data corresponding to a set of tiles that match on a one-to-one basis with a set of tiles that correspond to the viewport predicted by the brain-computer interface data (wherein, in this example, if there is not a one-to-one match in tiles the viewport predicted by the brain-computer interface data would be used instead).

In another example, the determination that the viewport predicted by the head movement data should be used can be made based upon the viewport predicted by the head movement data corresponding to a set of tiles that match at least on a percent basis (the percent of this example being less than 100 percent and greater than 0 percent) with a set of tiles that correspond to the viewport predicted by the brain-computer interface data (wherein, in this example, if there is not a match above a certain threshold percentage basis then the tiles of the viewport predicted by the brain-computer interface data would be used instead).

As described herein, improvements can be provided to viewport prediction accuracy and streaming efficiency for 360° videos via brain-computer interactions. Various embodiments bring one or more of the following four key benefits. First, congestion can be alleviated in the cellular core network by delivering less data for 360° videos through more accurate predication and more efficient content caching. Second, the cellular data usage of mobile users can be optimized and the stall time of video playback can be reduced, thus improving the quality of user experience. Third, energy consumption on mobile devices can be decreased, by avoiding transmitting unnecessary data when delivering 360° videos. Finally, various embodiments are lightweight and enable true spatial immersion by delivering 4K+ quality videos over a network infrastructure with limited bandwidth.

In another example, various embodiments can be implemented in the context of any type of panoramic or immersive video (e.g. 360° video, 180° video).

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 220, the functions of workflow 230, method 2000, method 300 and method 400 presented in FIGS. 1, 2C, 2G, 2H, 2I AND 2J. For example, virtualized communication network 300 can facilitate in whole or in part panoramic video streaming (such as in the context of viewport prediction/selection as described herein).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
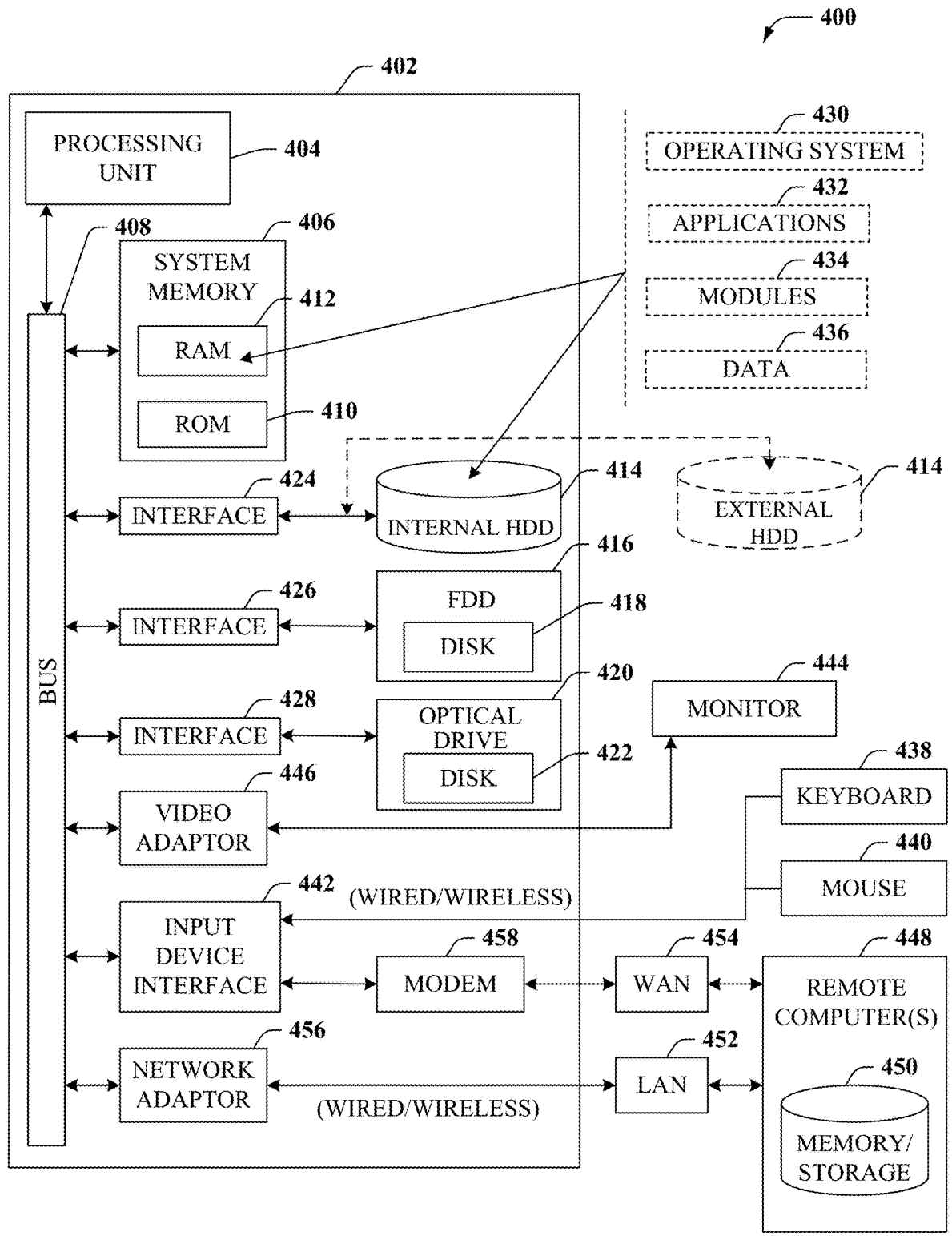
FIG. 4 is a block diagram illustrating an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part panoramic video streaming (such as in the context of viewport prediction/selection as described herein).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
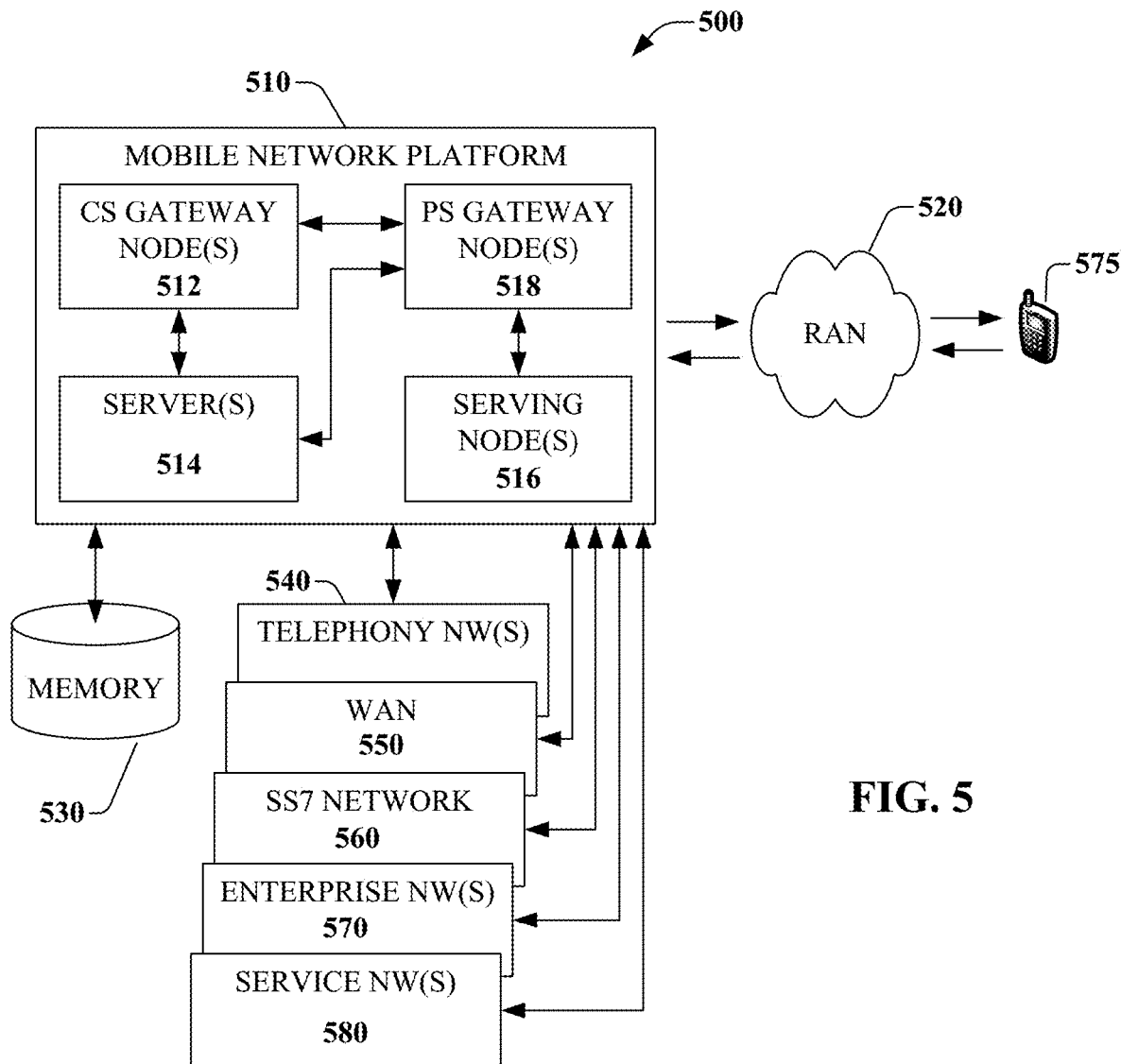
FIG. 5 is a block diagram illustrating an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part panoramic video streaming (such as in the context of viewport prediction/selection as described herein). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
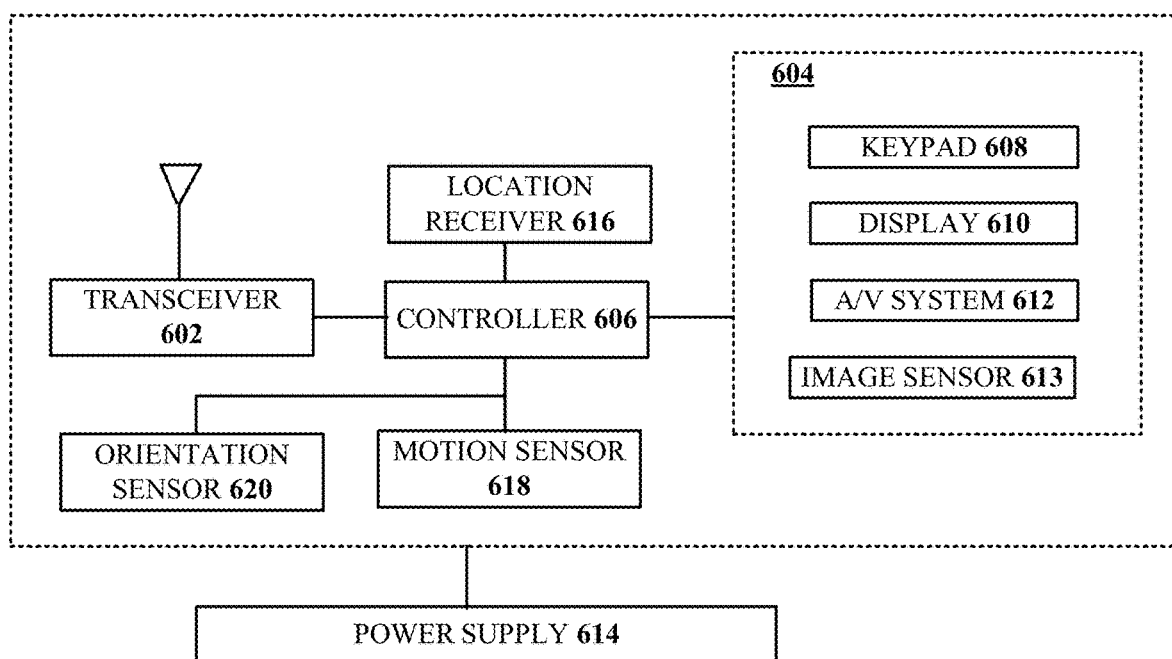
FIG. 6 is a block diagram illustrating an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part panoramic video streaming (such as in the context of viewport prediction/selection as described herein).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically predicting and/or selecting one or more viewports for use in performing panoramic video streaming) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

obtaining, by a system including a processor, one or more signals, the one or more signals being based upon brain activity of a viewer while the viewer is viewing media content;

predicting by the system, based upon the one or more signals, a first predicted desired viewport of the viewer;

obtaining, by the system, head movement data associated with the media content;

predicting by the system, based upon the head movement data, a second predicted desired viewport of the viewer;

comparing, by the system, the first predicted desired viewport to the second predicted desired viewport, resulting in a comparison, wherein the comparing of the first predicted desired viewport to the second predicted desired viewport comprises determining an amount of spatial overlap between the first predicted desired viewport and the second predicted desired viewport, wherein the amount of spatial overlap comprises a percentage of spatial overlap between the first predicted desired viewport and the second predicted desired viewport, wherein the comparison is indicative of the percentage of spatial overlap, wherein the determining of the amount of spatial overlap comprising using the first predicted desired viewport in a first case that the percentage of spatial overlap satisfies a threshold, and wherein the determining of the amount of spatial overlap comprises using the second predicted desired viewport in a second case that the percentage of spatial overlap does not satisfy the threshold; and determining by the system, based upon the comparison, to use the first predicted desired viewport to facilitate obtaining a first subsequent portion of the media content or to use the second predicted desired viewport to facilitate obtaining a second subsequent portion of the media content.

2. The method of claim 1, wherein the one or more signals is obtained in real-time via electroencephalography (EEG), magnetoencephalography (MEG), functional Magnetic Resonance Imaging (fMRI), or any combination thereof.

3. The method of claim 2, wherein the head movement data is obtained at least in part from a database of historic head movement data, wherein the historic head movement data is associated with a plurality of other viewers who had previously viewed the media content, and wherein the predicting the second predicted desired viewport of the viewer comprises predicting based upon the historic head movement data.

4. The method of claim 3, wherein the predicting the second predicted desired viewport of the viewer further comprises predicting based upon other head movement data associated with the viewer who is viewing the media content.

5. The method of claim 4, wherein the other head movement data is obtained in real-time while the viewer is viewing the media content.

6. The method of claim 5, wherein the predicting the second predicted desired viewport of the viewer further comprises comparing the other head movement to the historic head movement data.

7. The method of claim 1, wherein the media content comprises panoramic media content.

8. The method of claim 7, wherein, the first predicted desired viewport corresponds to a first portion of the panoramic media content, and wherein the first portion of the panoramic media content comprises a first spatial subset of the panoramic media content.

9. The method of claim 8, wherein the second predicted desired viewport corresponds to a second portion of the panoramic media content, wherein the second portion of the panoramic media content comprises a second spatial subset of the panoramic media content, and wherein the first spatial subset is different from the second spatial subset.

10. The method of claim 1, wherein the system comprises an end user device, and wherein:
in a first case when it is determined that the first predicted desired viewport is to be used, the obtaining the first subsequent portion of the media content is performed by the end user device; or
in a second case when it is determined that the second predicted desired viewport is to be used, the obtaining the second subsequent portion of the media content is performed by the end user device.

11. The method of claim 10, wherein:
in the first case the obtaining the first subsequent portion of the media content comprises obtaining the first subsequent portion of the media content from a server; or
in the second case the obtaining the second subsequent portion of the media content comprises obtaining the second subsequent portion of the media content from the server.

12. The method of claim 11, wherein:
in the first case the first subsequent portion of the media content is obtained responsive to a first request for the first subsequent portion of the media content, the first request having been sent by the end user device to the server; or
in the second case the second subsequent portion of the media content is obtained responsive to a second request for the second subsequent portion of the media content, the second request having been sent by the end user device to the server.

13. A device comprising:
a processing system including a processor; and
a memory that stores executable instructions that, when executed by the processing system, facilitate performance of operations, the operations comprising:
obtaining from one or more sensors brain activity data that is based upon brain activity of a viewer, the brain activity data being associated with viewing by the viewer of media content;
predicting a first predicted desired viewport of the viewer, the first predicted desired viewport being predicted based upon the brain activity data;
obtaining head movement data associated with the media content;
predicting a second predicted desired viewport of the viewer, the second predicted desired viewport being based upon the head movement data; and
determining, based upon a comparison of the first predicted desired viewport to the second predicted desired viewport, whether to use the first predicted desired viewport to facilitate obtaining a first subsequent portion of the media content or to use the second predicted desired viewport to facilitate obtaining a second subsequent portion of the media content, wherein the comparison comprises a determination of an amount of spatial overlap between the first predicted desired viewport and the second predicted desired viewport, wherein the amount of spatial overlap comprises a percentage of spatial overlap between the first predicted desired viewport and the second predicted desired viewport, wherein the comparison is indicative of the percentage of spatial overlap, wherein the determination is made using the first predicted desired viewport in a first case that the percentage of spatial overlap satisfies a threshold, and wherein the determination is made using the second predicted desired viewport in a second case that the percentage of spatial overlap does not satisfy the threshold.

14. The device of claim 13, further comprising the one or more sensors.

15. The device of claim 14, wherein the one or more sensors comprise one or more electroencephalography (EEG) sensors, one or more magnetoencephalography (MEG) sensors, one or more functional Magnetic Resonance Imaging (fMRI) sensors, or any combination thereof.

16. The device of claim 14, wherein:
the device comprises an end user device;
the media content comprises panoramic media content;
the first predicted desired viewport corresponds to a first portion of the panoramic media content;
the first portion of the panoramic media content comprises a first spatial subset of the panoramic media content;
the second predicted desired viewport corresponds to a second portion of the panoramic media content;

the second portion of the panoramic media content comprises a second spatial subset of the panoramic media content; and the first spatial subset is different from the second spatial subset.

17. The device of claim 16, wherein the first spatial subset partially overlaps spatially with the second spatial subset.

18. The device of claim 13, wherein the head movement data is obtained at least in part from a database of historic head movement data.

19. A non-transitory machine-readable medium comprising executable instructions that, when executed by a processing system, facilitate performance of operations, the operations comprising:

receiving from a device a request for a portion of media content, the request indicating a desired viewport, the request having been made by the device in accordance with a first determination by the device to use as the desired viewport one of a first predicted desired viewport or a second predicted desired viewport, the first determination having been based upon a comparison between the first predicted desired viewport and the second predicted desired viewport, the first predicted desired viewport having been predicted by the device based upon brain activity of a viewer engaged in watching an earlier portion of the media content, and the second predicted desired viewport having been predicted by the device based upon head movement data associated with the earlier portion of the media content, wherein the comparison comprises a second determination of an amount of spatial overlap between the first predicted desired viewport and the second predicted desired viewport, wherein the amount of spatial overlap comprises a percentage of spatial overlap between the first predicted desired viewport and the second predicted desired viewport, wherein the comparison is indicative of the percentage of spatial overlap, wherein the second determination is made using the first predicted desired viewport in a first case that the percentage of spatial overlap satisfies a threshold, and wherein the second determination is made using the second predicted desired viewport in a second case that the percentage of spatial overlap does not satisfy the threshold; and sending, to the device, the portion of media content that had been requested.

20. The non-transitory, machine-readable medium of claim 19, wherein:

the processing system comprises a content server that stores the media content that had been requested;

the media content that is stored by the content server comprises panoramic media content; and the device comprises an end user device.

* * * * *